3,491,159
PROCESS FOR THE PREPARATION OF SATURATED ALIPHATIC ALCOHOLS
Manfred Reich and Klaus Schneider, Marl, Germany, assignors to Chemische Werke Huls Aktiengesellschaft, Marl, Germany, a corporation of Germany
No Drawing. Filed Sept. 30, 1966, Ser. No. 583,416
Claims priority, application Germany, Nov. 26, 1965, C 37,501
Int. Cl. C07c 29/14
U.S. Cl. 260—638   1 Claim

ABSTRACT OF THE DISCLOSURE

A process for the preparation of saturated aliphatic alcohols by catalytic hydrogenation of aldehydes in the vapor phase, characterized by the use of a copper-nickel catalyst on a carrier material, composed of 97 to 75 percent by weight of a silicon gel carrier and 3 to 25 percent by weight of copper and nickel as the activating metals, the copper content ranging from 60 to 80 percent by weight and the nickel content correspondingly ranging from 40 to 20 percent by weight based upon the sum total of the activating metals.

---

It is known to prepare saturated aliphatic alcohols by catalytic hydrogenation of the appropriate saturated or unsaturated aldehydes.

The German Patents Nos. 838,746 and 848,944 propose hydrogenation in the liquid phase in the presence of a nickel catalyst, a process which results in a mixture of saturated alcohol and saturated aldehyde. However, the yields from this process are unsatisfactory.

The German Patent No. 931,827 describes a process in the gaseous phase and in two stages using different catalysts for each stage, namely a copper-nickel catalyst on a carrier material in the first stage and a modified copper-carrier catalyst in the second stage. Saturated alcohols together with substantial quantities of saturated aldehydes as well as unsaturated aldehydes and alcohols are produced. The unsaturated alcohols are particularly undesirable because it is difficult to separate the saturated alcohol by distillation.

In case of other known, improved, processes resulting in more simple products a pure copper-carrier catalyst, possibly containing a known modifier, is employed in the first stage of the hydrogenation of unsaturated aldehydes in the gaseous phase and a copper-nickel carrier catalyst or a pure nickel carrier catalyst is employed in the second stage (German Patents Nos. 1,152,393 and 1,161,-250). The British Patent No. 938,028 proposes employment of this system of catalysts for the hydrogenation of saturated aldehydes.

In case of the process disclosed by French Patent No. 1,349,816 a pure copper carrier catalyst is used for the first stage and a palladium catalyst for the second stage. However, the saturated alcohols obtained by the last-mentioned process still contain detectable amounts of unsaturated compounds and the proportion of saturated aldehydes is at least one part to one hundred.

We have now developed a process for the preparation of saturated aliphatic alcohols by catalytic hydrogenation of aldehydes in the vapor phase, characterized by the used of a copper-nickel catalyst on a carrier material, composed of 97 to 75 percent by weight of a silica gel carrier and 3 to 25 percent by weight of copper and nickel as the activating metals, the copper content ranging from 60 to 80 percent by weight and the nickel content correspondingly ranging from 40 to 20 percent by weight based upon the sum total of the activating metals.

The process permits, under flexible conditions, the preparation of pure saturated alcohols. In many instances it is possible to employ the alcohols so obtained directly without any intermediate purification steps such as distillation, for example for esterification.

In case of the process disclosed by the German Patent No. 931,827 copper-nickel catalysts are primarily used within the first stage with pumice as well as kieselguhr as carrier materials with a copper:nickel ratio of approximately 1:1.

The copper-nickel catalyst described by German Patent No. 1,152,393 likewise utilize pumice and kieselguhr as carrier materials and the carrier content is only 10 to 25 percent by weight and the copper:nickel ratio differs from the ratio employed in the process of the present invention. The last-mentioned patent does state that it is also possible to use pure copper-nickel catalysts but that such catalysts are not suitable due to their great activity.

It is the aim of the present invention to overcome these disadvantages by the employment of a copper-nickel catalyst with a low content of activating metals and by using as carrier material a specific species of the silicic acid, namely silica gel.

The aldehydes to be hydrogenated are conducted in the form of vapor and mixed with hydrogen over the catalyst which is placed in a reaction vessel, the vessel most advantageously being designed in the form of a tube.

The hydrogenated vapors leaving the reaction vessel are then condensed and, if necessary, processed further by distillation, suitably under reduced pressure. The hydrogenation temperature ranges from 120 to 220° C., preferably from 140 to 200° C. The pressure within the hydrogenation chamber is optional provided that the aldehydes to be hydrogenated as well as the hydrogenated products are kept in the gaseous state.

The copper-nickel carrier catalysts are prepared by applying to the carrier material the proper copper and nickel salts and the modifying additives, if any, preferably in the form of solutions, and by subsequent reduction of the catalysts so obtained in a stream of hydrogen or by use of other standard reducing agents. Silica gel is used exclusively as carrier material.

The activating metals copper and nickel make up 3 to 25 percent by weight, preferably 8 to 20, and especially 10 to 15 percent by weight of the total weight of the catalyst.

The ratio of the metals nickel:copper ranges from 1:1.5 to 1:4, in other words nickel makes up 20 to 40 percent by weight of the sum total of the activating metals copper and nickel and copper amounts to from 80 to 60 percent by weight. The carrier may also hold the usual modifying agents for copper catalysts such as chromium or magnesium or compounds thereof, for example their oxides, or a phosphate, tungstate, dichromate.

The content of these modifying substances should not exceed 50 percent by weight relative to the sum total of the activating metals.

EXAMPLE 1

Over 1 liter of catalyst, filled into a tube, there was conducted at a temperature of 160° C. and at a working absolute pressure of 15 atmospheres 150 g./h. of water-containing, vaporized (88%) crotonaldehyde together with 1500 Nl./h. of hydrogen. Condensation was carried out within the pressure section of a cooling system.

The catalyst contained 9 percent by weight of copper, 3 percent by weight of nickel and .4 percent by weight of chromium on silica gel as the carrier material. It had been prepared by applying to the carrier material the appropriate quantities of copper carbonate, nickel formate and chromic acid from ammoniacal-aqueous solutions and treatment in a stream of hydrogen at approximately 200° C.

The condensed aqueous n-butanol contained .003 percent by weight of unsaturated compounds, calculated as crotonaldehyde and detected by bromination as well as .05 percent by weight of aldehyde, calculated as butylaldehyde. The loss caused by formation of hydrocarbons was less than .5%. No acetals could be detected.

EXAMPLE 2

Over the catalyst described in Example 1, containing 9 percent by weight of copper, 3 percent by weight of nickel and .4 percent by weight of chromium on silica gel, and under the conditions specified in Example 1, there was conducted 150 g./h. of 2-ethylhexenal-1 in vapor form together with 1500 Nl./h. of hydrogen. Condensation was then carried out within the pressure section of a cooling system. The condensed hydrogenation product was 2-ethylhexanol-1, containing .006 percent by weight of unsaturated compounds, calculated as ethylhexenal and detected by bromination, and .06 percent by weight of aldehyde, calculated as ethylhexanol. The loss caused by formation of hydrocarbons was less than .5%. No acetals could be detected.

After distillation at a pressure of 20 torr and a head temperature of 93° C., the product still contained .002 percent by weight of unsaturated compounds, calculated as ethylhexenal, and .01 percent by weight of aldehyde, calculated as ethylhexanol. For purposes of comparison, the above specified catalyst was replaced by a catalyst containing 3 percent by weight of copper, 9 percent by weight of nickel and .4 percent by weight of chromium on silica gel, but without changing any other conditions and the condensed hydrogenation product, 2-ethylhexanol-1, contained .001 percent by weight of unsaturated compounds, calculated as ethylhexenal and detected by bromination, and .3 percent by weight of aldehyde, calculated as ethylhexanal. The loss caused by formation of hydrocarbon was approximately 2%. For purposes of further comparison a catalyst which contained 4 percent by weight of copper, 4 percent by weight of nickel and .2 percent by weight of chromium on pumice was used under the conditions of Example 2, and the condensed hydrogenation product, 2-ethylhexanol-1, contained 5.3 percent by weight of aldehyde, calculated as ethylhexanal and 1.2 percent by weight of unsaturated compounds, calculated as ethylhexenal and detected by bromination.

The hydrogenation temperature was raised to 200° C. and the aldehyde content was reduced to 3.2 percent by weight and the content of unsaturated compounds to .5 percent by weight.

For final comparison a catalyst was employed which contained 9 percent by weight of copper, 3 percent by weight of nickel and .4 percent by weight of chromium on pumice and the condensed hydrogenation product, 2-ethylhexanol-1, contained 3.2 percent by weight of aldehyde, calculated as ethylhexanal, and 1.1 percent by weight of unsaturated compounds, calculated as ethylhexenal and detected by bromination.

The hydrogenation temperature was raised to 200° C., and the aldehyde content was reduced to 1.2 percent by weight and the content of unsaturated compounds to .2 percent by weight.

EXAMPLE 3

Over 1 liter of catalyst, filled into a tube, containing 9 percent by weight of copper, 3 percent by weight of nickel and .4 percent by weight of chromium on silica gel as carrier material, there was conducted at a temperature of 180° C. and a working pressure of .1 atmospheres gauge 150 g./h. of vaporized butyraldehyde, containing .07% of unsaturated compounds which were calculated as crotonaldehyde and detected by bromination, together with 900 Nl./h. hydrogen. Subsequently condensation was carried out in a cooling system, in the final stage by use of cold traps.

The condensed hydrogenation product was butanol and contained .08 percent by weight of aldehyde, calculated as butyraldehyde, and .01 percent by weight of unsaturated compounds, calculated as crotonaldehyde and detected by bromination. The loss caused by formation of hydrocarbons was less than .5%. No acetals could be detected. After 150 days of operation non significant change in yield was found.

For purposes of comparison a catalyst was employed which contained 4 percent by weight of copper, 4 percent by weight of nickel and .2 percent by weight of chromium on pumice and the hydrogenation was then carried out under the conditions set forth in Example 3 and the condensed hydrogenation product, impure butanol, contained 10.5 percent by weight of aldehyde, calculated as butyraldehyde, and .03 percent by weight of unsaturated compounds, calculated as crotonaldehyde and detected by bromination. The hydrogenation temperature was raised to 220° C. and the aldehyde content was reduced to 5.2 percent by weight and the content of unsaturated compounds to .01 percent by weight. The loss caused by the formation of hydrocarbons was rather great (approximately 5 percent by weight).

For the purpose of further comparison a catalyst was employed which contained 9 percent by weight of copper, 3 percent by weight of nickel and .4 percent by weight of chromium on pumice and the condensed hydrogenation product, impure butanol, contained 4.3 percent by weight of aldehyde, calculated as butyraldehyde and .03 percent by weight of unsaturated compounds, calculated as crotonaldehyde and detected by bromination. The hydrogenation temperature was raised to 220° C. and the aldehyde content was reduced to 2.1 percent by weight and the content of unsaturated compounds to .01 percent by weight. The loss caused by the formation of hydrocarbons was rather great (approximately 5 percent by weight).

EXAMPLE 4

Over 1 liter of catalyst, filled into a tube, prepared as described in Example 1 and containing 9 percent by weight of copper, 3 percent by weight of nickel and .4 percent by weight of chromium on silica gel, there was conducted at a temperature of 180° C. and a working pressure of .05 atmospheres gauge 60 g./h. of water-containing vaporized crotonaldehyde (88%) together with 900 Nl./h. of hydrogen. Subsequently condensation was carried out in a cooling system, in the final stage by use of cold traps.

The condensed n-butanol contained .09 percent by weight of aldehyde, calculated as butyraldehyde, and .01 percent by weight of unsaturated compounds, calculated as crotonaldehyde and detected by bromination. The loss caused by the formation of hydrocarbons was less than .5%. No acetals could be detected. After distillation the product contained less than .01 percent by weight of aldehyde, calculated as butyraldehyde, and less than .005 percent by weight of unsaturated compounds, calculated as crotonaldehyde and detected by bromination. After 100 days of operation no significant change in yield was found.

Comparative example

The operation was carried out in two stages by following the process described by German Patent No. 1,152,393. The lower portion of a reaction tube was filled with .5 liter of a copper-nickel catalyst, composed as set forth in Example 1, and above it in the upper portion with .5 liter of a catalyst containing 20% of copper and 1% of chromium on silica gel. The catalysts were activated by a treatment at approximately 200° C. in a stream of hydrogen.

Over this combination of catalysts there was conducted from the top to the bottom at 160° C., 150 g./h. of vaporized 2-ethylhexenal-1 together with 1500 Nl./h. of hydrogen. Thereupon condensation was carried out within the pressure section of a cooling system.

The condensed hydrogenation product was 2-ethylhexanol-1 and contained .3 percent by weight of unsaturated compounds, calculated as ethylhexenal and detected by bromination, and .3 percent by weight of aldehyde, calculated as ethylhexanal. After distillation which was carried out by use of the same equipment and under the same conditions as described in Example 2 the product still contained .2 percent by weight of unsaturated compounds, calculated as ethylhexenal, and .03 percent by weight of aldehyde, calculated as ethylhexanal.

Therefore, when compared with Example 2, the content of unsaturated compounds was much greater and the aldehyde content was greater to some extent. In contrast to Example 2 it was practically impossible to separate the unsaturated compounds by distillation. Therefore, the impurities which were formed within the first stage could not be removed sufficiently even by employment of the copper-nickel catalyst used in accordance with the invention.

We claim:
1. Process for the preparation of a saturated aliphatic alcohol from the corresponding aldehyde selected from the group consisting of crotonaldehyde, butyraldehyde and 2-ethylhexenal, which comprises passing the aldehyde in the vapor phase, together with hydrogen at 120–220° C. in contact with a body of a copper-nickel catalyst composition, said body of catalyst composition being prepared by applying copper and nickel salts to silica gel and then reducing, which body of catalyst composition consists of about 9 weight percent copper, about 3 weight percent nickel, about 0.4 weight percent chromium and the remainder silica gel.

References Cited

UNITED STATES PATENTS

| | | | |
|---|---|---|---|
| 3,232,978 | 2/1966 | Yasuhara et al. | 252—454 |
| 3,239,448 | 3/1966 | Wilson | 252—454 |
| 2,119,899 | 6/1938 | Zorn et al. | 260—638 |
| 3,371,050 | 2/1968 | Taylor et al. | 252—459 |

FOREIGN PATENTS

| | | |
|---|---|---|
| 249,540 | 5/1963 | Australia. |
| 316,399 | 8/1929 | Great Britain. |
| 734,247 | 7/1955 | Great Britain. |

LEON ZITVER, Primary Examiner

JOSEPH E. EVANS, Assistant Examiner

U.S. Cl. X.R.

252—437, 457, 458, 459